(12) United States Patent
Johnson et al.

(10) Patent No.: US 10,129,093 B1
(45) Date of Patent: Nov. 13, 2018

(54) STRATEGIC NETWORK FORMATION INVOLVING INFORMATION SOURCES, AGGREGATORS, AND CONSUMERS

(71) Applicant: HRL Laboratories, LLC, Malibu, CA (US)

(72) Inventors: Samuel Johnson, Benicia, CA (US); Tsai-Ching Lu, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 727 days.

(21) Appl. No.: 14/670,811

(22) Filed: Mar. 27, 2015

Related U.S. Application Data

(60) Provisional application No. 61/972,117, filed on Mar. 28, 2014.

(51) Int. Cl.
   *H04L 12/24* (2006.01)
(52) U.S. Cl.
   CPC ................................. *H04L 41/142* (2013.01)
(58) Field of Classification Search
   CPC ..................................................... H04L 41/142
   USPC .............................................................. 703/2
   See application file for complete search history.

(56) References Cited

PUBLICATIONS

Zhang, Y. and Van Der Schaar, M. 2013. "Strategic networks: Information dissemination and link formation among self-interested agents. Selected Areas in Communications". IEEE Journal on 31, 6, 1115-1123.*

Dellarocas et al. "Media, aggregators, and the link economy: Strategic hyperlink formation in content networks". Feb. 2012. 32 Pages.*

Bala, V., et al., (2000) "A noncooperative model of network formation," Econometrica 68, 5, p. 1181-1229.

Dellarocas, C., et al., (2013) "Media, aggregators, and the link economy: Strategic hyperlink formation in content networks," Management Science 59, 10, pp. 2360-2379.

(Continued)

*Primary Examiner* — Eunhee Kim
(74) *Attorney, Agent, or Firm* — Tope-McKay & Associates

(57) ABSTRACT

Described is a system for modeling strategic network formation. A network formation model is generated using a concatenation of joint strategies s of a set of N agents, such that $s=s_S s_A s_C$. The N agents include a group of source agents $N_S$, a group of aggregator agents $N_A$, and a group of consumer agents $N_C$, each group of agents having a distinct joint strategy for accessing a set of information. $s_S$ represents a joint strategy of the group of source agents, $s_A$ represents a joint strategy of the group of aggregator agents, and $s_C$ represents a joint strategy of the group of consumer agents. The network formation model is operated according to the joint strategies of the set of N agents. Data relating to the set of N agents of the network formation model is output for the investigation of the formation of information diffusion networks.

18 Claims, 7 Drawing Sheets

(56) References Cited

PUBLICATIONS

Fabrikant, A., et al., (2003), "On a network creation game," In PODC '03: Proceedings of the twenty-second annual symposium on Principles of distributed computing. ACM, New York, NY, USA, pp. 347-351.

Galeotti, A, et al., (2010), "The law of the few," American Economic Re-view 100, 4, pp. 1468-1492.

Hochbaum, D. S., et al., (1998), "Analysis of the greedy approach in problems of maximum k-coverage," Naval Research Logistics (NRL) 45, 6, pp. 615-627.

Jackson, M. O., et al., (1996), "A strategic model of social and economic networks," Journal of Economic Theory 71, 1, pp. 44-74.

Palme, E., et al., (2012), "Attention allocation in information-rich environments: The case of news aggregators," In Proceedings of the 14th Annual International Conference on Electronic Commerce. ICEC '12. ACM, New York, NY, USA, pp. 25-26.

Zhang, Y., et al., (2013) "Strategic networks: Information dissemination and link formation among self-interested agents," Selected Areas in Communications, IEEE Journal on 31, 6, pp. 1115-1123.

Nash, John, (1951) "Non-Cooperative Games," The Annals of Mathematics, Second Series, vol. 54, No. 2, pp. 286-295.

Johnson, S.D. and Lu, T-C. 2014. Algorithm Instance Games. Computing Research Repository, arXiv: 1405.3296, pp. 1-10.

* cited by examiner

STRATEGIC NETWORK FORMATION INVOLVING INFORMATION SOURCES, AGGREGATORS, AND CONSUMERS

CROSS-REFERENCE TO RELATED APPLICATIONS

This is a Non-Provisional Application of U.S. Provisional Patent Application No. 61/972,117, filed Mar. 28, 2014, entitled, "Model of Strategic Network Formation Involving Information Sources, Aggregators, and Consumers."

BACKGROUND OF INVENTION (1) Field of Invention

The present invention relates to a system for modeling strategic network formation and, more particularly, to a system for modeling strategic network formation involving information sources, aggregators, and consumers.

(2) Description of Related Art

The World Wide Web offers consumers access to an unprecedented quantity of information. Consumers wading into this flood of information have found that negotiating its waters can be overwhelming. This difficulty has presented the opportunity for the rise in prominence of a third-party role of a web site or computer software, referred to as the aggregator, who can intercede on behalf of the consumer to mediate the stream of information that has traditionally flowed uninhibited from the producer (source) to the consumer.

Network formation games that pertain to the production and consumption of information includes the work of Galeotti and Goyal (see the List of Incorporated Literature References, Literature Reference No. 4), who model information as a public good that agents can either produce for themselves or acquire by linking to others. They show that networks with core-peripheral structures tend to arise in Nash equilibrium, wherein agents in the periphery link to agents in the core who provide the information. Galeotti and Goyal found that, in addition to information producers, the core can also include non-producing agents that link to multiple producers (essentially, aggregators) who then attract links from the other non-producing agents in the periphery.

Zhang and van der Schaar (Literature Reference No. 8) studied a variant of the model presented in Literature Reference No. 4 in which, instead of agents receiving utility from access to information, individual agents receive a utility based on the number other agents they get to receive information from them. In their model, every agent is endowed with some quantity of information, and agents form links to push their information to others. Zhang and van der Schaar (Literature Reference No. 8) show that, like Galeotti and Goyal (see Literature Reference No. 4), networks with core-peripheral structure arise in Nash equilibrium.

Furthermore, Dellarocas, Katona, and Rand (see Literature Reference No. 2) developed a strategic model of network formation that allows them to look directly into the tension between information sources and aggregators. Their analysis focuses on examining how the presence of aggregators affects the information landscape on the World Wide Web, with a particular focus on the market conditions that arise in such a setting. Dellarocas et al. (see Literature Reference No. 2) developed an elaborate model that captures many of the intricacies of the content marketplace that presently exists on the World Wide Web. Each of the methods above exhibit limitations that make them incomplete.

Thus, a continuing need exists for a simplified model which captures key aspects of the information ecosystem on the World Wide Web.

SUMMARY OF THE INVENTION

The present invention relates to system for modeling strategic network formation and, more particularly, to a system for modeling strategic network formation involving information sources, aggregators, and consumer. The system comprises one or more processors and a non-transitory computer-readable medium having executable instructions encoded thereon such that when executed, multiple operations are performed. generating a network formation model at an initial state using a concatenation of joint strategies s of a set of N agents, such that $s=s_S s_A s_C$, the N agents including a group of information source agents $N_S$, a group of information aggregator agents $N_A$, and a group of information consumer agents $N_C$, each group of agents having a distinct joint strategy for accessing a set of information. $s_S$ represents a joint strategy of the group of information source agents, $s_A$ represents a joint strategy of the group of information aggregator agents, and $s_C$ represents a joint strategy of the group of information consumer agents. The network formation model is operated in accordance with the joint strategies of the set of N agents. Data relating to the set of N agents of the network formation model is output for the investigation of the formation of information diffusion networks.

In another aspect, the set of N agents is partitioned into distinct groups based on heterogeneous incentives.

In another aspect, the joint strategy of the group of information source agents, $s_S$, determines an allocation of the set of information among the group of information source agents $N_S$.

In another aspect, the joint strategy of the group of information aggregator agents, $s_A$, induces a directed network comprising edges between information aggregator agents and information source agents.

In another aspect, the joint strategy of the group of information consumer agents, $s_C$, introduces a set of additional edges to the directed network, connecting information consumer agents with at least one of information aggregator agents and information source agents In another aspect, a net utility to an information source agent $i \in N_S$ given a joint strategy $s=\{s_i\}_{i \in N_S}$ is defined to be:

$$u_i(s)=\beta_S(\delta_{G_S}^-(i))-s_i,$$

where $\beta_S(x)$ is a function that conveys a benefit that an information source agent i gets from attracting information aggregator agents and information consumer agents, $G_S$ represents the directed network, and $\delta_{G_S}^-(i)$ denotes an out-degree of an agent i in $G_S$.

In another aspect, a net utility to an information aggregator agent $i \in N_A$ given a joint strategy s is defined to be:

$$u_i(s)=\beta_A(\delta_{G_S}^-(i))-\alpha_A(|s_i|),$$

where $\beta_A$ is a function that conveys a benefit that an information aggregator agent i gets from attracting information consumer agents, and $\alpha_A$ is a function representing an edge construction cost in the directed network.

In another aspect, a net utility to an information consumer agent $i \in N_C$, given a joint strategy s, is defined to be:

$$u_i(s)=\beta_C(\Gamma_{G_S}(i))-\alpha_C(|s_i|),$$

where $\Gamma_{G_S}(i)$ is a fraction of the set of information that i has access to in $G_S$, and $\beta_C(x)$ is a function that conveys a benefit that i gets from accessing the fraction of the set of information.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
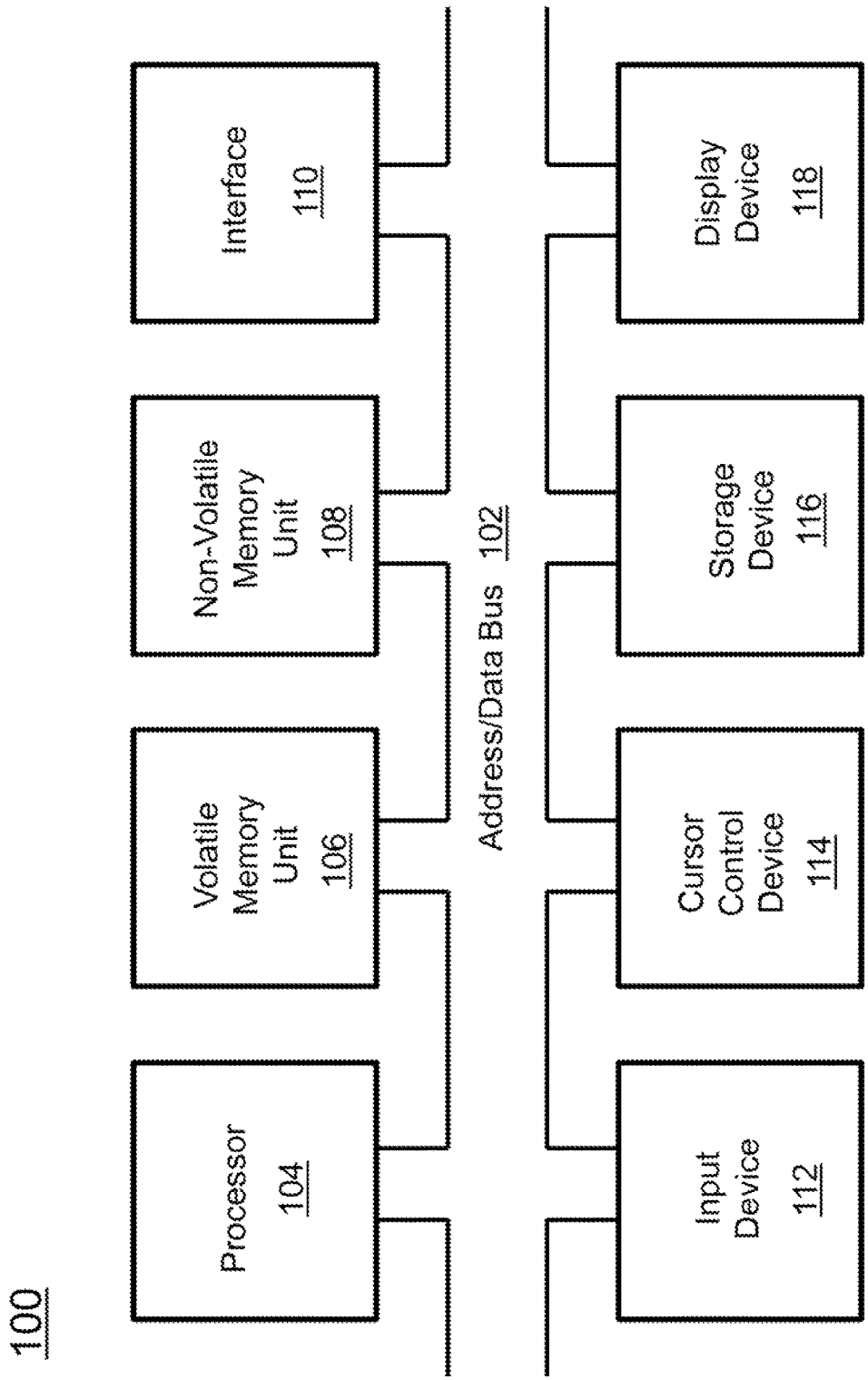
FIG. 1 is a block diagram depicting the components of a system for strategic network formation according to the principles of the present invention.

The present invention relates to a system for modeling strategic network formation and, more particularly, to a system for modeling strategic network formation involving information sources, aggregators, and consumer. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Finally, specific details of the present invention are provided to give an understanding of the specific aspects.

(1) List of Incorporated Literature References

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:

1. Bala, V. and Goyal, S. 2000. A noncooperative model of network formation. Econometrica 68, 5, 1181-1229.
2. Dellarocas, C., Katona, Z., and Rand, W. 2013. Media, aggregators, and the link economy: Strategic hyperlink formation in content networks. Management Science 59, 10, 2360-2379.
3. Fabrikant, A., Luthra, A., Maneva, E., Papadimitriou, C. H., and Shenker, S. 2003. On a network creation game. In PODC '03: Proceedings of the twenty-second annual symposium on Principles of distributed computing. ACM, New York, N.Y., USA, 347-351.
4. Galeotti, A. and Goyal, S. 2010. The law of the few. American Economic Re-view 100, 4, 1468-1492.
5. Hochbaum, D. S. and Pathria, A. 1998. Analysis of the greedy approach in problems of maximum k-coverage. Naval Research Logistics (NRL) 45, 6, 615-627.
6. Jackson, M. O. and Wolinsky, A. 1996. A strategic model of social and economic networks. Journal of Economic Theory 71, 1, 44-74.
7. Palme, E., Dellarocas, C., Calin, M., and Sutanto, J. 2012. Attention allocation in information-rich environments: The case of news aggregators. In Proceedings of the 14th Annual International Conference on Electronic Commerce. ICEC '12. ACM, New York, N.Y., USA, 25-26.

8. Zhang, Y. and Van Der Schaar, M. 2013. Strategic networks: Information dissemination and link formation among self-interested agents. Selected Areas in Communications, IEEE Journal on 31, 6, 1115-1123.
9. Nash, John. 1951. Non-Cooperative Games. The Annals of Mathematics, Second Series, Vol. 54, No. 2, 286-295.
10. Johnson, S.D. and Lu, T-C. 2014. Algorithm Instance Games. Computing Research Repository, arXiv: 1405.3296.

The present invention has three "principal" aspects. The first is a system for modeling strategic network formation. The system is typically in the form of a computer system operating software or in the form of a "hard-coded" instruction set. This system may be incorporated into a wide variety of devices that provide different functionalities, such as a robot or other device. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
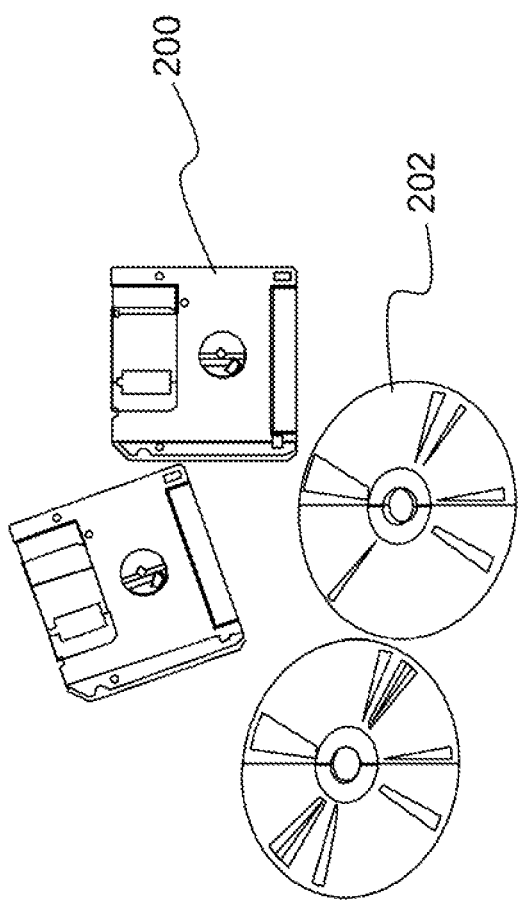
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of the Invention

Network formation seeks to model how a network evolves by identifying which factors affect its structure and how these mechanisms operate. Network formation hypotheses are tested by using either a dynamic model with an increasing network size or by making an agent-based model to determine which network structure is the equilibrium in a fixed-size network. The World Wide Web offers consumers access to an unprecedented quantity of information. Consumers wading into this flood of information have found that negotiating its waters can be overwhelming. This difficulty has presented the opportunity for the rise in prominence of a third-party role of a web site or computer software, referred to as the aggregator, who can intercede on behalf of the consumer to mediate the stream of information that has traditionally flowed uninhibited from the producer (source) to the consumer. An aggregator undertakes the task of curating the producers' information, filtering the flood of information down to a trickle, and feeding the results to the consumer. With the information it presents, the aggregator also provides a reference to the source of the presented information. Thus, if so inclined, a consumer can wade in deeper (and so the aggregator can defend themselves against accusations of plagiarism). Because aggregators and the information producers they depend upon are both competing for the patronage of the same consumers, there has developed a significant (if unsurprising) tension between information sources (i.e., producers) and aggregators (see Literature Reference Nos. 2 and 7).

Described is a model to investigate the information ecosystem of sources (producers), aggregators, and consumers, where competition between types is accessory to intramural competition (i.e., sources competing with other sources, and aggregators competing with other aggregators). For the purposes of the present invention, the terms "producer" and "source" are used interchangeably and refer to entities that publish original content. Non-limiting examples include journalists, newspapers, and bloggers (to the extent that their content is original). A "consumer" is an entity that consumes information/content and models the typical Internet user who browses webpages, watches videos, and buys things. An "aggregator" is an entity involved in compiling information on other entities and selling that information to others. The system according to the principles of the present invention is a strategic model of network formation called the Information Source-Aggregator-Consumer (ISAC) game, which captures key aspects of this ecosystem. In it, a set of source agents, aggregator agents, and consumer agents are specified. The three software agent types are differentiated by their methods and motives for accessing information.

Figure 3:
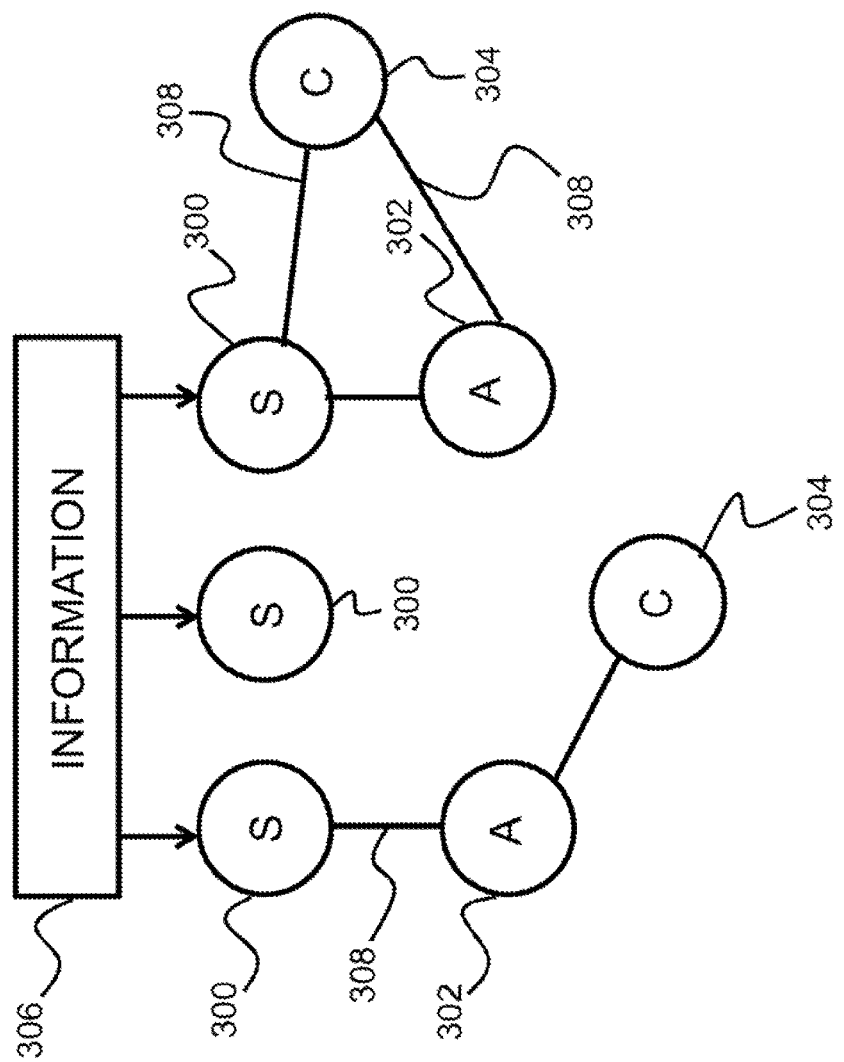
FIG. 3 is an illustration of a set of software agents partitioned into distinct groups based on heterogeneous incentives according to the principles of the present invention.

As illustrated in FIG. 3, source agents 300 and aggregator agents 302 compete to attract consumer agents 304 by gaining access to information 306 which they can provide to the consumer agents 304 they have attracted. For source agents 300, access to information 306 is secured by splitting the total amount of information 306 available amongst themselves, so that an individual source agent 300 has exclusive access to their piece of the information 306 pie. Aggregator agents 302 are unable to introduce any new information 306 into the system, so they must acquire it from those who are capable of producing information: the source agents 300. An aggregator agent 302 may need to build costly links 308, as described in further detail below, to source agents 300 to secure their access to information 306. Consumer agents 304 may only be interested in the acquisition of information 306; they may not be interested in subsequently disseminating this information 306. Therefore, a consumer agent 304 may build costly links 308 to aggregator agents 302 and/or source agents 300 and get a utility based on the quantity of information 306 that they manage to gain access to, less the cost of acquiring it.

(3.1) The Model

The following describes embodiments of the network formation model, the Information Source-Aggregator-Consumer (ISAC) game, according to the principles of the present invention. The model involves a set of N agents that are (exogenously) partitioned into three groups based on their role as information sources, $N_S$ (i.e., source agents 300), information aggregators, $N_A$ (i.e., aggregator agents 302), and information consumers, $N_C$ (i.e., consumer agents 304). Let $|N_X|=n_X$ denote the cardinality of the set $N_X$ for $X \in \{S, A, C\}$. It is assumed that an individual agent i belongs to exactly one of the three sets.

Before describing the model in detail, first some of the notation used is described. Let $s=(s_i)_{i \in N}$ denote the joint strategy of all agents $N=N_S \cup N_A \cup N_C$ (source agents 300, aggregator agents 302, consumer agents 304). Further, let $s_S$, $s_A$, and $s_C$ denote the joint strategies of all source agents 300, aggregator agents 302, and consumer agents 304, respectively. This way, the joint strategy of all agents (source agents 300, aggregator agents 302, consumer agents 304) can be written as the concatenation of the joint strategies of the three types: $s=s_S s_A s_C$. A joint strategy s specifies a directed network $G_S=(N, E_S)$, as will be described in detail below. The degree of a node/agent i in $G_S$ is denoted by $\delta_{G_S}(i)$, and the in- and out-degree is denoted by $\delta_{G_S+}(i)$ and $\delta_{G_S-}(i)$, respectively. The convention is that the directionality of the edges in $G_S$ corresponds to the direction of flow of information, so that the edge (i,j) conveys that j receives information from i (or, equivalently, that i has access to j's information).

The degree of a node in a graph/network is the number of edges/links incident to it. For example, if the network is a simple "line" of three nodes A-B-C, the degrees of A and C are both one while the degree of B is two. In a directed graph/network, the in-degree of a node is its number of incoming edges, and the out-degree of a node is its number of out-going edges. For example, if the directed network is A→B→C, the in-degrees of B and C are both one while the in-degree of A is zero. The out-degrees of A and B are both one while the out-decree of C is zero.

To formalize the model, let I denote the entirety of information 306 in the system and available to source agents 300. To facilitate the division of I (i.e., information 306) among the source agents 300, an allocation mechanism 400 S is exogenously specified (depicted in FIG. 4), which will be described in further detail below. A strategy $s_i \geq 0$ for a source agent 300 $i \in N_S$ corresponds to i's input to the allocation mechanism 400. A joint strategy among source agents 300, denoted $s_S = \{s_i\}_{i \in N_S}$, is given to the allocation mechanism 400 which then allocates to each source agent 300 i a fraction $S(s_S) \in [0,1]$ of the information 306 I, with the constraint that the allocation mechanism 400 can only allocate what information 306 is available (i.e., $\Sigma_{i \in N_S} S(s_S, i) \leq 1$). The net utility to a source agent 300 $i \in N_S$ given a joint strategy $s = \{s_i\}_{i \in N_S}$ is defined to be:

$$u_i(s) = \beta_S(\delta_{G_S}^-(i)) - |s_i|, \quad \text{(Equation 1)}$$

where $\beta_S(x)$ is a function that conveys the benefit that i gets from attracting x customers (i.e., aggregator agents 302 and/or consumer agents 304), and $|s_i|$ represents the size of agent i's strategy, which is the number of links that i builds in the network. It is assumed that $\beta_S(\cdot)$ is non-decreasing with $\beta_S(0) = 0$ so that a source agent 300 is never explicitly penalized for attracting links from customers.

Figure 4:
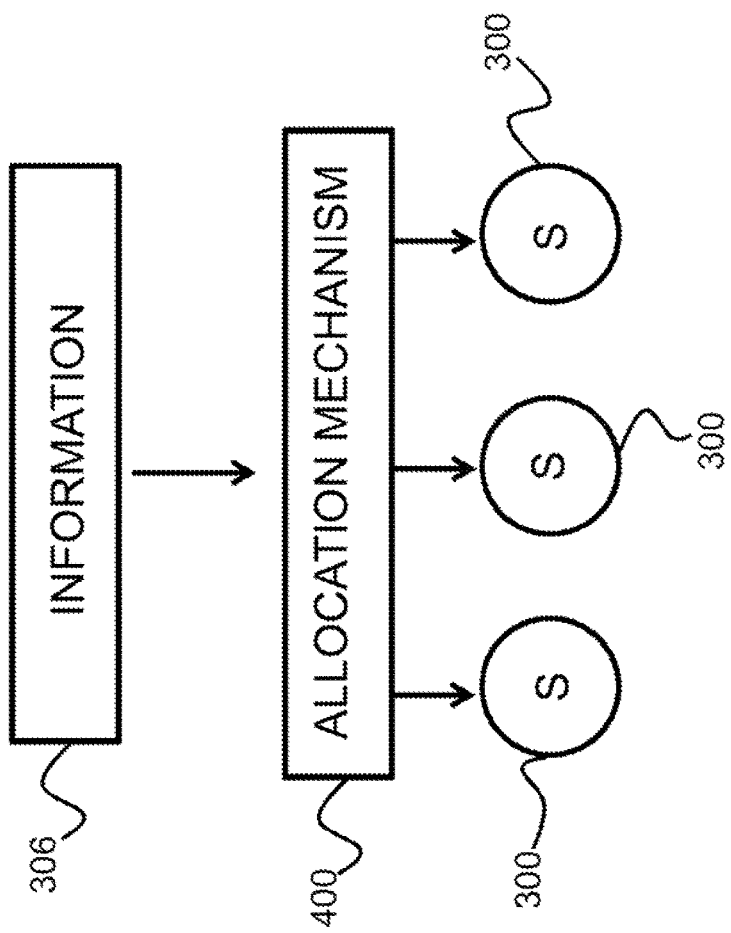
FIG. 4 is an illustration of an allocation mechanism for dividing information between a group of information source agents according to the principles of the present invention.

Whereas the strategies of source agents 300 correspond to inputs into an allocation mechanism 400 S, the strategies of aggregator agents 302 and consumer agents 304 correspond to building links 308 (or edges). For each aggregator agent 302 or consumer agent 304 $i \in N_A \cup N_C$, a strategy $s_i$ is a set of other agents that i is intent on establishing a direct connection (i.e., link 308) with. In this way, each entry $j \in s_i$ specifies that agent i builds a directed link 308 (j,i), granting access to any information 306 possessed by agent j. The direction of links 308 conveys the directed flow of information 306. A joint strategy $s = s_S s_A s_C$, thus, specifies two things:

1. The source agents' 300 input $s_S$ (i.e., information 306) into the allocation mechanism 400 S, which then determines how the information 306 I is divided among the source agents 300 $N_A$, as shown in FIG. 4.
2. A directed network $G_S = (N, E_S)$ with the edge set $E_S = \{(j,i): j \in s_i\}$ defined as the union of all the edges specified by the joint strategy $s_A s_C$ among aggregator agents 304 and consumer agents 306.

Figure 5:
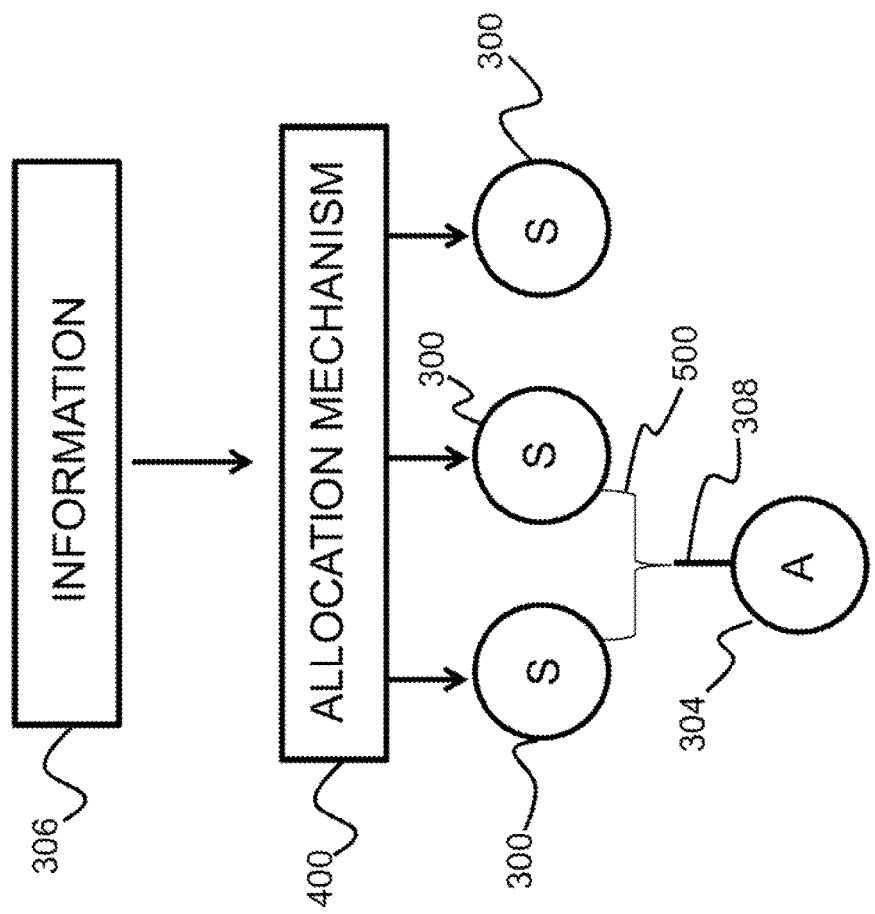
FIG. 5 is an illustration of the strategy of an information aggregator agent for establishing connections with information source agents according to the principles of the present invention.

Like source agents 300, aggregator agents 302 also derive benefit from attracting customers for the information they procure. However, unlike source agents 300, aggregator agents 304 are unable to introduce any new information into the environment, and must therefore acquire their information from others (i.e., source agents 300). To do so, an aggregator agent 302 $i \in N_A$ chooses a strategy $s_i \subset N_S$ that specifies a subset 500 of source agents 300 that i establishes connections with, as illustrated in FIG. 5. Although the present formulation of the model according to the principles of the present invention only allows aggregator agents 302 to establish links 308 with source agents 300, one could generalize the model to allow aggregator agents 302 to also link to fellow aggregator agents 302.

Therefore, an entry $j \in s_i$ corresponds to a directed edge (j, i), representing the flow of information 306 to i from j. Building links 308 is costly to the aggregator agent 304. These construction costs are captured by the function $\alpha_A: \mathbb{Z}_{\geq 0} \to \mathbb{R}$ with the assumption that $\alpha_A(0) = 0$. The net utility that an aggregator agent 304 $i \in N_A$ receives given a joint strategy s is defined to be:

$$u_i(s) = \beta_A(\delta_{G_S}^-(i)) - \alpha_A(|s_i|), \quad \text{(Equation 2)}$$

where $\beta_A$ is a function accounting for the benefit that i gets from attracting x consumer agents 304 of the information 306 acquired by i. Again, it is assumed that these benefits are non-decreasing and $\beta_A(0) = 0$. Because an aggregator agent 302 i's edge construction cost is simply a function of the number of edges they build, it is noted that $\alpha_A(|s_i|) = \alpha_A(\delta_{G_S}^+(i))$. Implicit in the definition of construction costs is a homogeneity assumption in which it is required that the cost of an edge (j, i) does not depend on the identities of either j or i.

Figure 6:
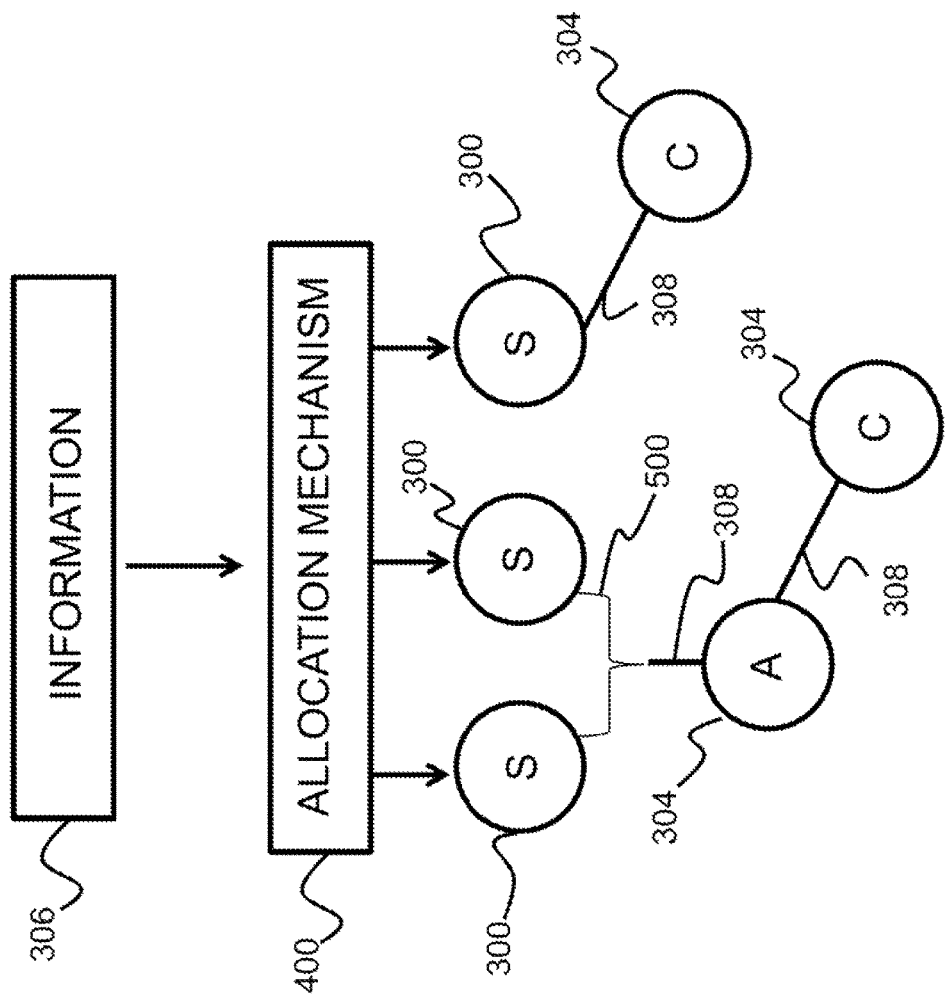
FIG. 6 is an illustration of the strategy of information consumer agents for establishing connections with information sources agents and information aggregator agents according to the principles of the present invention.

Finally, consumer agents 304 are defined to only derive value from the consumption of (equivalently, access to) information 306. As depicted in FIGS. 3 and 6, a consumer agent 304 acquires access to information 306 by establishing links 308 to information source agents 300 and/or aggregator agents 302. The strategy of a consumer agent 304 $i \in N_C$ is, therefore, a subset $s_i \subset N_S \cup N_A$. As with aggregator agents 302, a consumer agent 304 must pay for the edges they establish. This cost is specified by the function $\alpha_C: \mathbb{Z}_{\geq 0} \to \mathbb{R}$ with the assumption that $\alpha_C(0) = 0$. The net utility derived by a consumer agent 304 $i \in N_C$, given a joint strategy s, is defined to be:

$$u_i(s) = \beta_C(\Gamma_{G_S}(i)) - \alpha_C(|s_i|), \quad \text{(Equation 3)}$$

where $\Gamma_{G_S}(i) \in [0,1]$ is the fraction of information 300 that i has access to in $G_S$, and $\beta_C(x)$ is a function that describes the benefit that i gets from accessing an x fraction of I. It is assumed that $\beta_C(x)$ is non-negative over its range $0 \leq x \leq 1$, and that $\beta_C(0) = 0$.

Figure 7:
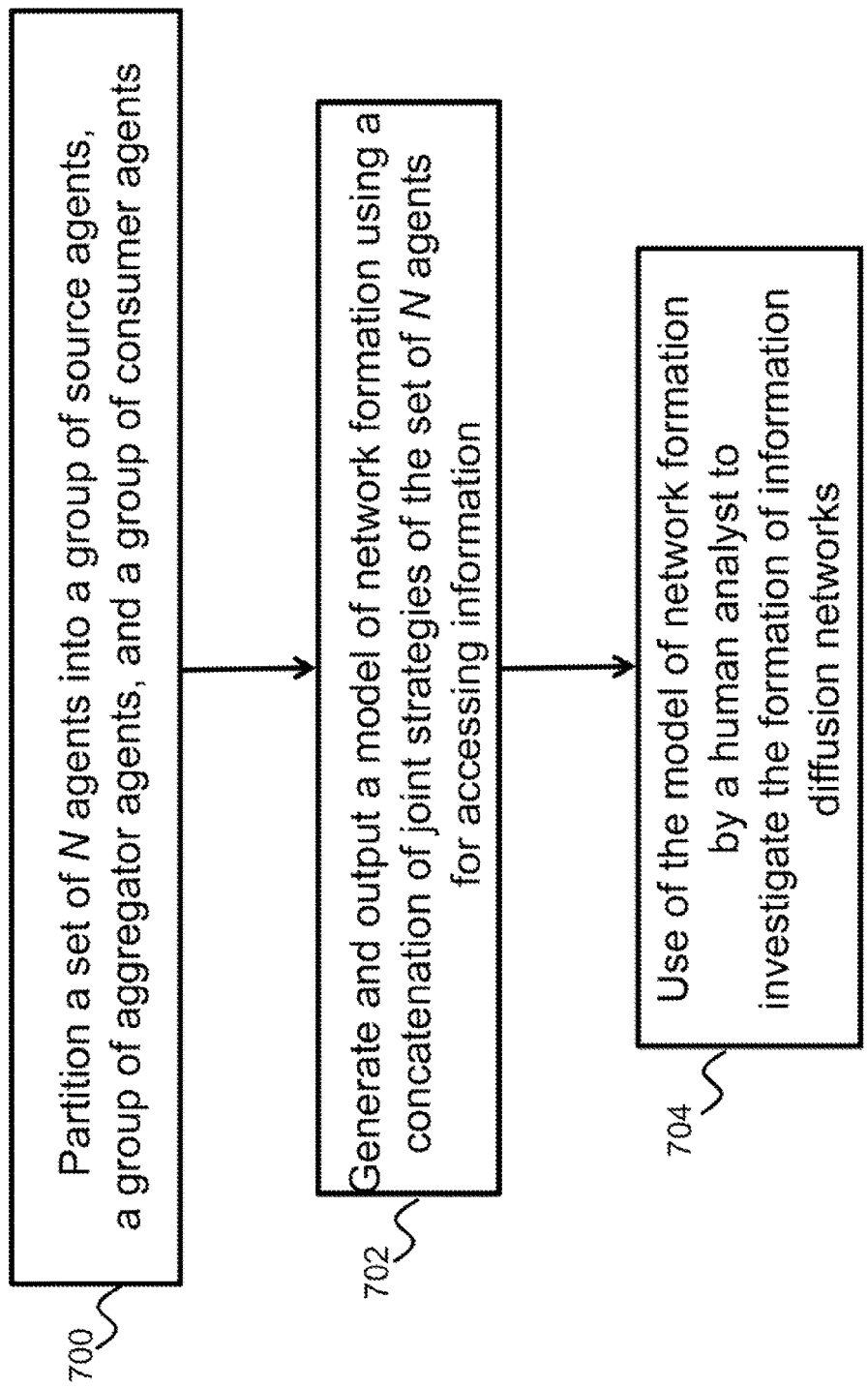
FIG. 7 is a flow diagram depicting a system for modeling strategic network formation according to the principles of the present invention.

FIG. 7 depicts a flow diagram of the system for modeling strategic network formation according to the principles of the present invention. As described above, in an initial operation 700, a set of N agents is partitioned into a group of information source agents, a group of information aggregator agents, and a group of information consumer agents. In a subsequent operation 702, a model of network formation is generated using a concatenation of joint strategies of the set of N agents for accessing information. In a final operation 704, the model of network formation is used to investigate the formation of information diffusion networks.

(3.2) Special Case and Equilibrium Analysis

Described below is a special case of the general model and a theorem characterizing Nash equilibrium outcomes.

(3.2.1) Lossless Information Transfer

It is assumed that information transfer between software agents (source agents 300, aggregator agents 302, and consumer agents 304) is lossless, stipulating that indirect access to information 306 effectively qualifies as direct access to information 306. Under this assumption, information 306 flows without friction. For example, suppose an aggregator agent 302 $\alpha \in N_A$ builds a link 308 to a source agent 300 $s \in N_S$. In a lossless setting, a consumer agent 304 c can access s's information 306 equally well by building a link 308 to s directly or by building a link 308 to $\alpha$ through which they can access s's information indirectly. The assumption of lossless information transfer is common to many network formation models found in the literature (see Literature Reference Nos. 1, 4, and 8).

In the lossless setting, the $\Gamma_{G_S}(\bullet)$ term of consumer agents' 304 utility function (Equation 3) is defined to be the sum of the fractional allocations of I allotted source agents 300 for whom the consumer agent 304 is reachable in $G_S$;

$$\Gamma_{G_S}(i) = \Sigma_{j \in N_S} S(s_S, j) \cdot 1_{j \to i}^{G_S},$$

where $$1_{j \to i}^{G_S} = \begin{cases} 1 & \text{if there exists a } j \to i \text{ path in } G_s, \\ 0 & \text{otherwise.} \end{cases}$$

(3.2.2) Linearity

It is assumed that the utility functions are composed of linear benefits and costs. Under the linearity assumption, there exist constants $\beta_S$, $\beta_A$, $\beta_C \geq 0$ and $\alpha_A$, $\alpha_C > 0$ that characterize agents' benefits and costs. With a slight abuse of notation, the linearity assumption replaces the utility functions in Equations 1, 2, and 3 with:

$$\forall i \in N_S, \ u_i(s) = \beta_S \delta_{G_S}^-(i) - s_i, \quad \text{(Equation 4)}$$

$$\forall i \in N_A, \ u_i(s) = \beta_A \delta_{G_S}^-(i) - \alpha_A |s_i|, \quad \text{(Equation 5)}$$

and $$\forall i \in N_C, \ u_i(s) = \beta_C \Gamma_{G_S}(i) - \alpha_C |s_i|. \quad \text{(Equation 6)}$$

(3.2.3) Source Allocation Mechanism

There are many possible mechanisms that can be used to allocate the pool of information 306 I among the source agents 300, and the details of a specific allocation mechanism 400 can significantly affect the set of equilibrium outcomes. In one aspect of the present invention, the equal split mechanism, $S_=$, is employed, which splits I uniformly among the $n_S$ source agents 300 so that each agent $i \in N_S$ is allocated a $1/n_S$ fraction of the information 306. Since $S_=$ allocates each source agent 300 an equal-size fraction of I no matter their selections, this mechanism effectively reduces the source agents 300 to non-strategic actors. Additional allocation mechanisms 400 include, but are not limited to, "random split" (i.e., split by chance) or "preferential split" (i.e., condition upon the usefulness of the information source).

(3.2.4) Consumer Behavior

The formulation of the model according to the principles of the present invention ascribes the consumer agents 304 to a role in which strategy selection boils down to asking them to solve the following optimization problem: For a consumer agent 304 $i \in N_C$, given the joint strategy $s_{-i}$ of every other agent, choose a strategy:

$$s^*_i = s_i \in N_S \cup N_A u_i(s_i, s_{-i}). \quad \text{(Equation 7)}$$

In an embodiment, because a consumer agent's 304 optimal strategy will never include links 308 to other consumer agents 304, Equation 7 maximizes over strategies that only include building links 308 to subsets of $N_S \cup N_A$. As the next proposition shows, the search for a best-response strategy can be computationally intractable (assuming P≠NP).

(3.2.5) Proposition

In a setting with linear benefits and costs, computing a consumer agent's 304 best response is NP-hard. With the hardness of finding a consumer agent's 304 best-response strategy established, it is noted that an approximate best-response can be found that achieves a logarithmic approximation guarantee using the straight-forward greedy approach (see Literature Reference No. 5). The greedy algorithm builds an approximate best-response strategy $s_i$ by iteratively including elements $j \in N_S \cup N_A$ that have the highest marginal utility, terminating once the cost of adding an additional element exceeds its benefit. It is assumed that consumer agents 304 use the greedy algorithm in their strategy selection. Further, it is assumed that the greedy algorithm iterates deterministically over a canonical ordering of source agents 300 followed by aggregator agents 302.

(3.2.5.1) Characterization of Nash Equilibrium

The main result characterizing Nash equilibrium (see Literature Reference No. 9 for a description of the Nash equilibrium) for the ISAC game is stated in the following theorem:

Let $\varphi = \lfloor \beta_A n_C / \alpha_A \rfloor$ and $\varrho = \lfloor n_S \alpha_C / \beta_C + 1 \rfloor$. Nash equilibrium outcomes for the ISAC game in which I is allocated among the source agents 300 by the equal split mechanism (i.e., allocation mechanism 400) $S_=$, and every consumer agent 304 using the greedy approximate best response algorithm have the following features:

1. For every pair of aggregator agents 302, $j \in N_A$, $s_i \cap s_j = \emptyset$, where i and j are a pair of aggregator agents conditioned on them not linking to any common third party. This is indicated by the expression $s_i \cap s_j = \emptyset$, showing that the intersection ($\cap$) of their strategies is the empty set ($\emptyset$).
2. If $\exists i \in N_A$ such that $s_i = \emptyset$, then there will be $\lfloor n_S/\varphi \rfloor$ aggregator agents 302 $j \in N_A$ with $-s_i = \varrho$ and at most one with $-s_j = n_S (\text{mod } \varphi)$ while the remaining aggregator agents 302 i all have $s_i = \emptyset$, where mod denotes modulus.
3. If $\forall i \in N$, $s_i \neq \emptyset$, then every aggregator agent 302 $i \in N_A$ has a strategy $s_i$ with $-s_i = \varrho$.

Furthermore, if $n_A > \varrho \ n_S$ then the only Nash equilibrium strategies are of the type described in step 2 above, whereas both types are possible when $n_A \leq \varrho \ n_S$.

Described herein is a stylized model that captures some of the strategic considerations of aggregator agents. The aggregator agents model blogs and websites that curate information (e.g., news) rather than create information (e.g., reporting), such as CNN.com and tumblr.com. Note that one website can have dual modes. For example, when CNN.com reports original stories, it would be considered an information creator (source agent); however, when CNN.com aggregates world news for its audiences, it becomes an aggregator agent. As a non-limiting example, so-called "meta-blogs" (or blogs about blogs), such as r-bloggers.com, perform the role of the aggregator agents in the model according to the principles of the present invention.

In a competitive setting, one goal is to see what kinds of stable (equilibrium) outcomes one could expect if these kinds of blogs (i.e., meta-blogs) competed for the same group of customers. Equilibrium is determined through simulations and by theory, as described in Literature Reference No. 10. Experimental results indicated that depending on the relative number of, for instance, meta-blogs to "regular" (information producing) blogs (referred to as source agents in the model), one would expect equilibrium, displayed during a simulation, in which either (i) the meta-blogs evenly divide up the source agents among themselves so that they each have exclusivity on a distinct subset of source agents; or (ii) one (or a small number of) meta-blogs dominate all other meta-blogs creating a monopoly or oligopoly (depending on some particulars of how one models the customers' selection process). See Literature Reference No. 10 for a full description of the experimental studies, including initial conditions and processes performed. Non-limiting examples of additional goals are to speed up or slow down the reach of equilibrium, and investigating mechanisms to disturb equilibrium.

Analysis of the model described in the present invention can yield insights into the formation of network structures that emerge in settings like online social networks and social media. Such insights could be of interest, in both government and industry sectors, to those interested in exploiting the self-organizing nature of online social networks/media.

Network structure plays a significant role in determining the outcome of, for instance, many important economic and social relationships; therefore, it is crucial to know which network configurations will arise to be able to understand and/or predict outcomes. As non-limiting examples, the study of information diffusion networks can be used to detect popular topics in social media, stop the spread of computer viruses, analyze how misinformation spreads, generate explanatory models to understand how information propagates, generate predictive models of information diffusion, and identify influential information spreaders.

What is claimed is:

1. A system for modeling strategic network formation for understanding information spread in a social media network of connected users, the system comprising:
one or more processors and a non-transitory computer-readable medium having executable instructions encoded thereon such that when executed, the one or more processors perform operations of:
generating a network formation model at an initial state using a concatenation of joint strategies s of a set of N agents, such that $s=s_S s_A s_C$, the N agents including a group of information source agents $N_S$, a group of information aggregator agents $N_A$, and a group of information consumer agents $N_C$, each group of agents having a distinct joint strategy for accessing a set of information,
wherein $s_S$ represents a joint strategy of the group of information source agents, $s_A$ represents a joint strategy of the group of information aggregator agents, and $s_C$ represents a joint strategy of the group of information consumer agents;
operating the network formation model in accordance with the joint strategies of the set of N agents;
wherein, given each group of agents' joint strategy, each group of agents has a distinct net utility based on a distinct benefit to the group of agents;
wherein a net utility to an information source agent $i \in N_S$ given a joint strategy $s=\{s_i\}_{i \in N_S}$ is defined to be:

$$u_i(s) = \beta_S(\delta_{G_S}^-(i)) - s_i,$$

where $\beta_S(x)$ is a function that conveys a benefit that an information source agent i gets from attracting information aggregator agents and information consumer agents, $G_S$ represents the directed network, and $\delta_{G_S}^-(i)$ denotes an out-degree of an agent i in $G_S$;
outputting data relating to the set of N agents of the network formation model; and
based on the output data, establishing links between users in the social media network to control information spread in the social media network.

2. The system as set forth in claim 1, wherein the set of N agents is partitioned into distinct groups based on heterogeneous incentives.

3. The system as set forth in claim 1, wherein the joint strategy of the group of information source agents, $s_S$, determines an allocation of the set of information among the group of information source agents $N_S$.

4. The system as set forth in claim 1, wherein the joint strategy of the group of information aggregator agents, $s_A$, induces a directed network comprising edges between information aggregator agents and information source agents.

5. The system as set forth in claim 1, wherein the joint strategy of the group of information consumer agents, $s_C$, introduces a set of additional edges to the directed network, connecting information consumer agents with at least one of information aggregator agents and information source agents.

6. The system as set forth in claim 1, wherein a net utility to an information aggregator agent $i \in N_A$ given a joint strategy s is defined to be:

$$u_i(s) = \beta_A(\delta_{G_S}^-(i)) - \alpha_A(|s_i|),$$

where $\beta_A$ is a function that conveys a benefit that an information aggregator agent i gets from attracting information consumer agents, and $\alpha_A$ is a function representing an edge construction cost in the directed network.

7. The system as set forth in 1, wherein a net utility to an information consumer agent $i \in N_C$, given a joint strategy s, is defined to be:

$$u_i(s) = \beta_C(\Gamma_{G_S}(i)) - \alpha_C(|s_i|),$$

where $\Gamma_{G_S}(i)$ is a fraction of the set of information that i has access to in $G_S$, and $\beta_C(x)$ is a function that conveys a benefit that i gets from accessing the fraction of the set of information.

8. A computer-implemented method for modeling strategic network formation for understanding information spread in a social media network of connected users, comprising:
an act of causing one or more processors to execute instructions stored on a non-transitory memory such that upon execution, the one or more processors perform operations of:
generating a network formation model at an initial state using a concatenation of joint strategies s of a set of N agents, such that $s=s_S s_A s_C$, the N agents including a group of information source agents $N_S$, a group of information aggregator agents $N_A$, and a group of information consumer agents $N_C$, each group of agents having a distinct joint strategy for accessing a set of information,
wherein $s_S$ represents a joint strategy of the group of information source agents, $s_A$ represents a joint strategy of the group of information aggregator agents, and $s_C$ represents a joint strategy of the group of information consumer agents;
operating the network formation model in accordance with the joint strategies of the set of N agents;
wherein, given each group of agents' joint strategy, each group of agents has a distinct net utility based on a distinct benefit to the group of agents;
wherein a net utility to an information source agent $i \in N_S$ given a joint strategy $s=\{s_i\}_{i \in N_S}$ is defined to be:

$$u_i(s) = \beta_S(\delta_{G_S}^-(i)) - s_i,$$

where $\beta_S(x)$ is a function that conveys a benefit that an information source agent i gets from attracting information aggregator agents and information consumer agents, $G_S$ represents the directed network, and $\delta_{G_S}^-(i)$ denotes an out-degree of an agent i in $G_S$;
outputting data relating to the set of N agents of the network formation model; and based on the output data, establishing links between users in the social media network to control information spread in the social media network.

9. The method as set forth in claim 8, wherein the joint strategy of the group of information source agents, $s_S$, determines an allocation of the set of information among the group of information source agents $N_S$.

10. The method as set forth in claim 8, wherein the joint strategy of the group of information aggregator agents, $s_A$, induces a directed network comprising edges between information aggregator agents and information source agents.

11. The method as set forth in claim 8, wherein the joint strategy of the group of information consumer agents, $s_C$, introduces a set of additional edges to the directed network, connecting information consumer agents with at least one of information aggregator agents and information source agents.

12. The method as set forth in claim 8, wherein a net utility to an information aggregator agent $i \in N_A$ given a joint strategy s is defined to be:

$$u_i(s) = \beta_A(\delta_{G_S}^-(i)) - \alpha_A(|s_i|),$$

where $\beta_A$ is a function that conveys a benefit that an information aggregator agent i gets from attracting information consumer agents, and $\alpha_A$ is a function representing an edge construction cost in the directed network.

13. The method as set forth in claim 8, wherein a net utility to an information consumer agent $i \in N_C$, given a joint strategy s, is defined to be:

$$u_i(s) = \beta_C(\Gamma_{G_S}(i)) - \alpha_C(|s_i|),$$

where $\Gamma_{G_S}(i)$ is a fraction of the set of information that i has access to in $G_S$, and $\beta_C(x)$ is a function that conveys a benefit that i gets from accessing the fraction of the set of information.

14. A computer program product for modeling strategic network formation for understanding information spread in a social media network of connected users, the computer program product comprising:
computer-readable instructions stored on a non-transitory computer-readable medium that are executable by a computer having one or more processor for causing the processor to perform operations of:
generating a network formation model at an initial state using a concatenation of joint strategies s of a set of N agents, such that $s = s_S s_A s_C$, the N agents including a group of information source agents $N_S$, a group of information aggregator agents $N_A$, and a group of information consumer agents $N_C$, each group of agents having a distinct joint strategy for accessing a set of information,
wherein $s_S$ represents a joint strategy of the group of information source agents, $s_A$ represents a joint strategy of the group of information aggregator agents, and $s_C$ represents a joint strategy of the group of information consumer agents;
operating the network formation model in accordance with the joint strategies of the set of N agents;
wherein, given each group of agents' joint strategy, each group of agents has a distinct net utility based on a distinct benefit to the group of agents;
wherein a net utility to an information source agent $i \in N_S$ given a joint strategy $s = \{s_i\}_{i \in N_S}$ is defined to be:

$$u_i(s) = \beta_S(\delta_{G_S}^-(i)) - s_i,$$

where $\beta_S(x)$ is a function that conveys a benefit that an information source agent i gets from attracting information aggregator agents and information consumer agents, $G_S$ represents the directed network, and $\delta_{G_S}^-(i)$ denotes an out-degree of an agent i in $G_S$;
outputting data relating to the set of N agents of the network formation model; and
based on the output data, establishing links between users in the social media network to control information spread in the social media network.

15. The computer program product as set forth in claim 14, wherein the set of N agents is partitioned into distinct groups based on heterogeneous incentives.

16. The computer program product as set forth in claim 14, wherein the joint strategy of the group of information source agents, $s_S$, determines an allocation of the set of information among the group of information source agents $N_S$.

17. The computer program product as set forth in claim 14, wherein the joint strategy of the group of information aggregator agents, $s_A$, induces a directed network comprising edges between information aggregator agents and information source agents.

18. The computer program product as set forth in claim 14, wherein the joint strategy of the group of information consumer agents, $s_C$, introduces a set of additional edges to the directed network, connecting information consumer agents with at least one of information aggregator agents and information source agents.

* * * * *